(12) United States Patent
Tomioka et al.

(10) Patent No.: US 6,612,735 B2
(45) Date of Patent: Sep. 2, 2003

(54) INFRARED RAY CLINICAL THERMOMETER

(75) Inventors: Shigeru Tomioka, Kyoto (JP); Makoto Tabata, Kyoto (JP); Hiroyuki Ota, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/157,018

(22) Filed: May 30, 2002

(65) Prior Publication Data
US 2002/0186746 A1 Dec. 12, 2002

(30) Foreign Application Priority Data
Jun. 1, 2001 (JP) ........................................ 2001-167317

(51) Int. Cl.[7] .............................. G01K 1/08; G01J 5/04; A61B 1/227
(52) U.S. Cl. ...................... 374/121; 374/158; 374/208; 374/209; 600/184
(58) Field of Search .................... 374/208, 158, 374/121, 209; 600/474, 186, 184, 549

(56) References Cited

U.S. PATENT DOCUMENTS

| | | | | |
|---|---|---|---|---|
| 4,112,762 A | * | 9/1978 | Turner et al. .............. 73/343 R |
| 4,863,281 A | * | 9/1989 | Suszynski ................... 374/158 |
| 5,066,142 A | * | 11/1991 | DeFrank et al. ............ 374/208 |
| 5,167,235 A | * | 12/1992 | Seacord et al. ............. 128/664 |
| 5,487,607 A | * | 1/1996 | Makita et al. ............... 374/158 |
| 5,991,652 A | * | 11/1999 | Barthelemy et al. ........ 600/474 |
| 6,149,297 A | * | 11/2000 | Beerwerth et al. .......... 374/121 |
| 6,224,256 B1 | * | 5/2001 | Bala ........................... 374/158 |
| 6,332,090 B1 | * | 12/2001 | DeFrank et al. ............ 600/474 |
| 6,367,973 B2 | * | 4/2002 | Yamaka ...................... 374/158 |
| 6,386,757 B1 | * | 5/2002 | Konno ........................ 374/121 |
| 6,485,433 B1 | * | 11/2002 | Peng .......................... 600/549 |
| 2002/0163955 A1 | * | 11/2002 | Yu .............................. 374/208 |

FOREIGN PATENT DOCUMENTS

| | | | | |
|---|---|---|---|---|
| EP | 0565123 A1 | * | 4/1993 | ............. G01J/5/04 |
| WO | WO 95/00067 | | 1/1995 | |
| WO | WO 97/19332 | | 5/1997 | |

* cited by examiner

*Primary Examiner*—Christopher W. Fulton
*Assistant Examiner*—Gail Verbitsky
(74) *Attorney, Agent, or Firm*—Morrison & Foerster LLP

(57) ABSTRACT

An infrared ray clinical thermometer enhanced in fitted probe cover stability is provided with a simple structure. A mechanism for detecting the presence or absence of a fitted probe cover is provided near the root of a probe, and is mainly composed of a slide member as a movable part, a spring as thrusting means for thrusting the slide member, and a switch for making contact with and departing from the slide member. The slide member is movable disposed in a direction nearly perpendicular to the detaching direction of the probe cover, that is, from the inner side to the outer side, and from the outer side to the inner side of the probe.

8 Claims, 8 Drawing Sheets

[Fig. 1]
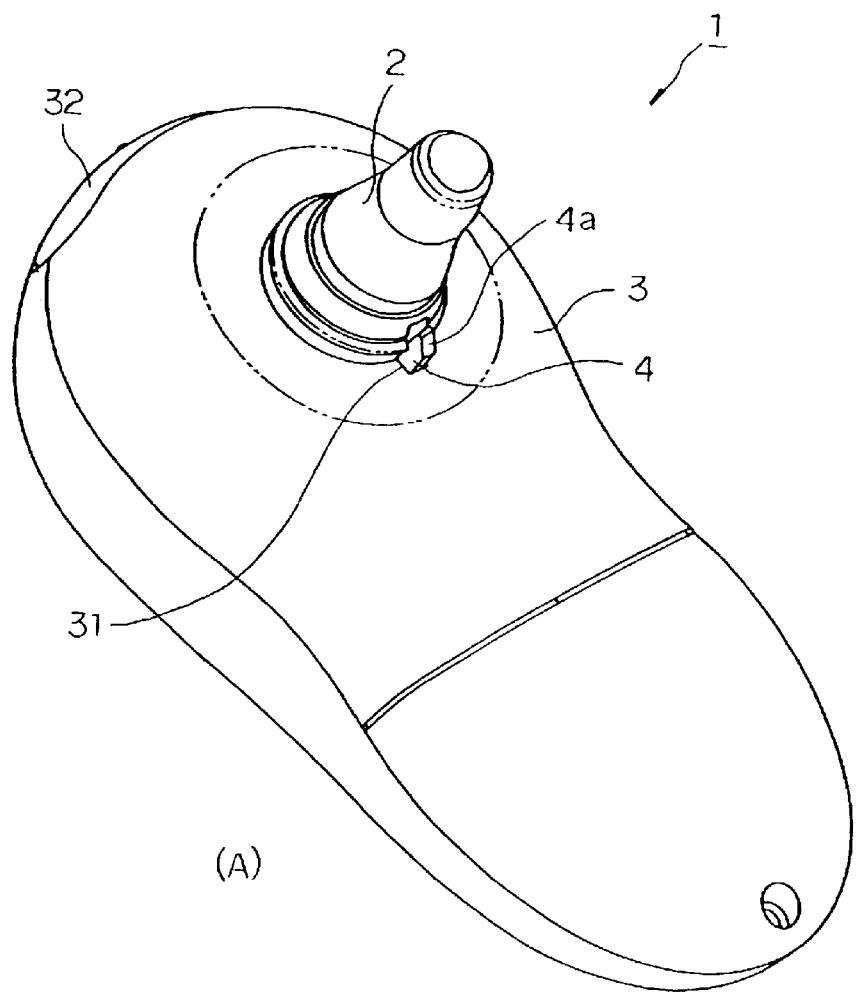
(A)
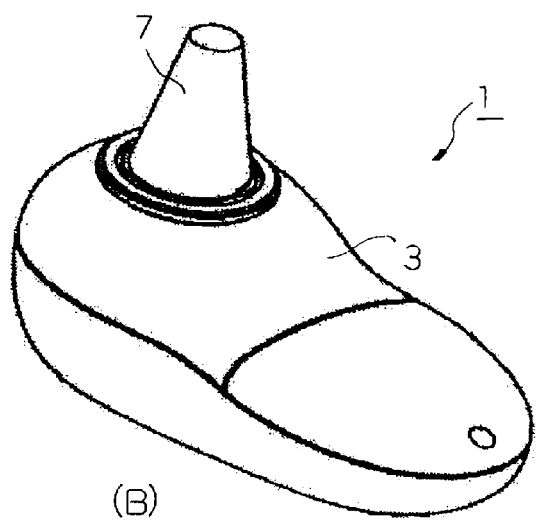
(B)

[Fig. 2]
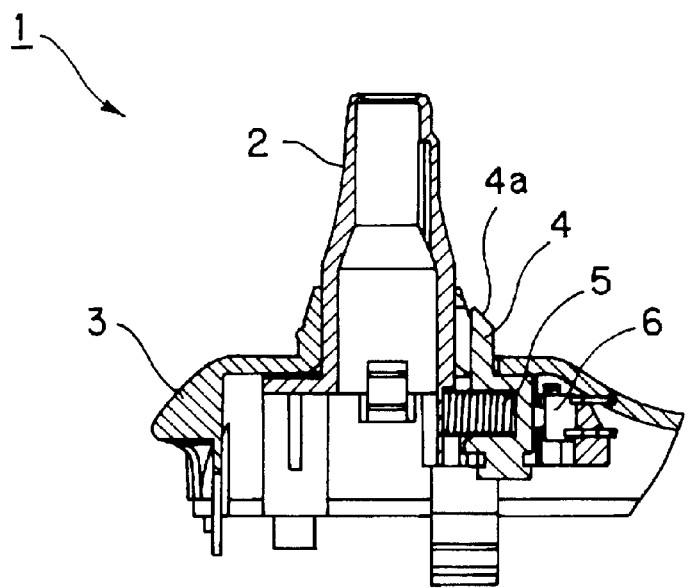
[Fig. 3]
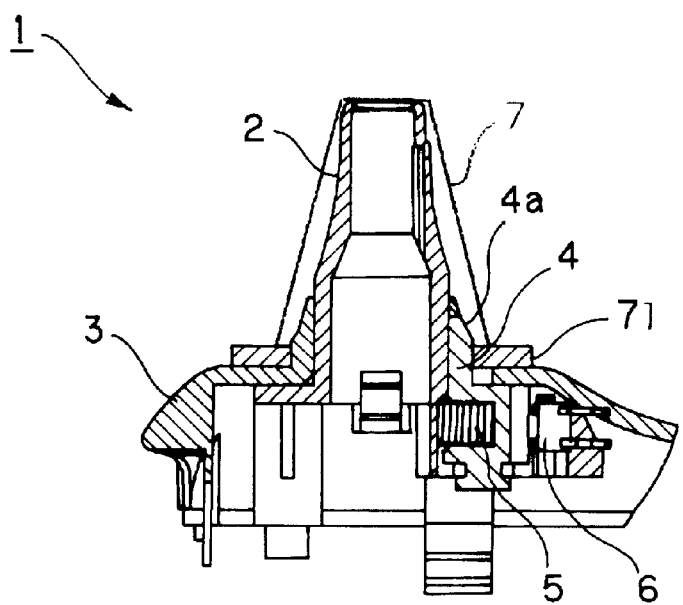

[Fig. 4]
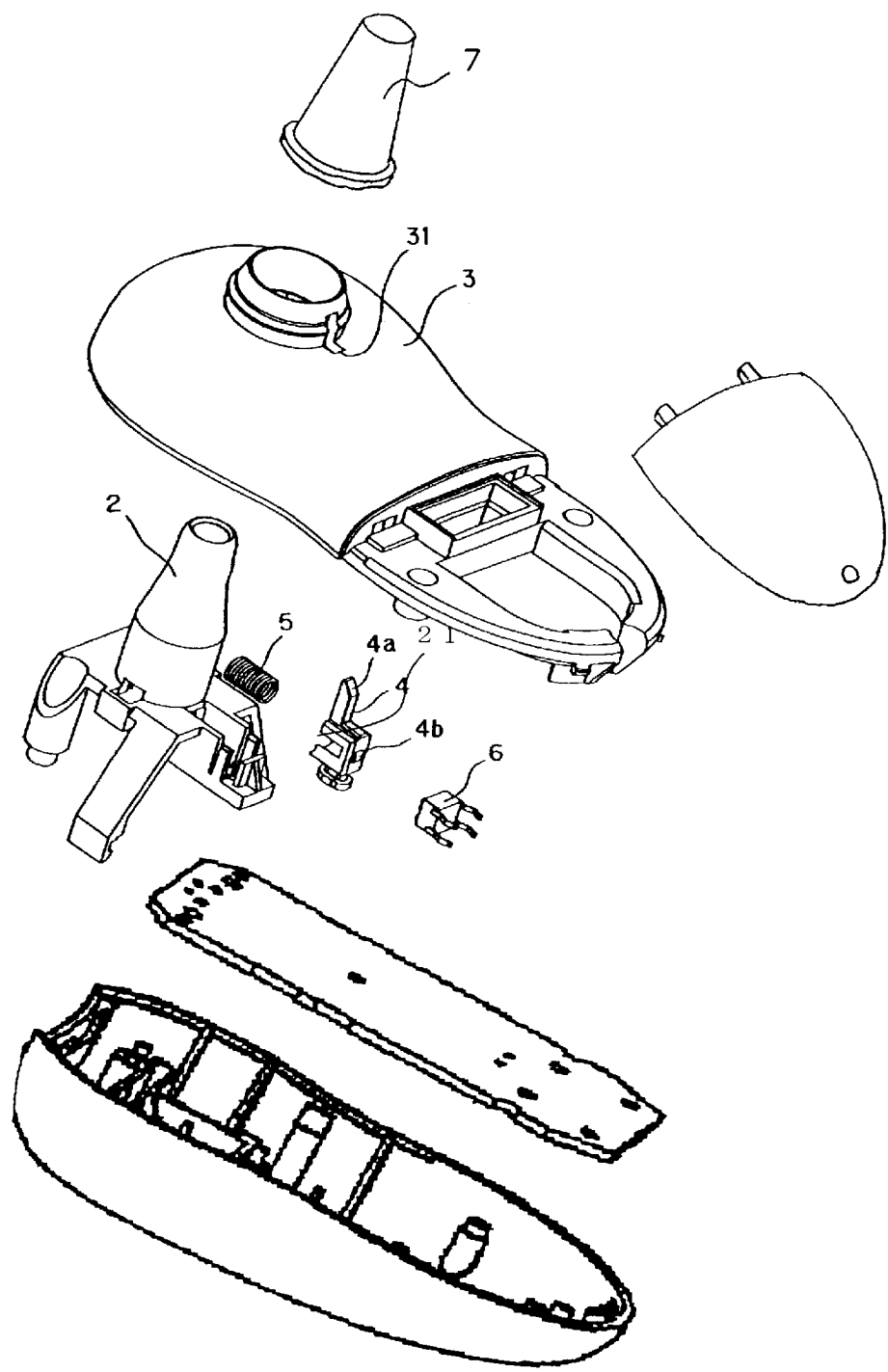

[Fig. 5]
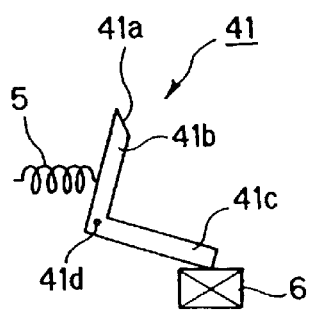
(A)
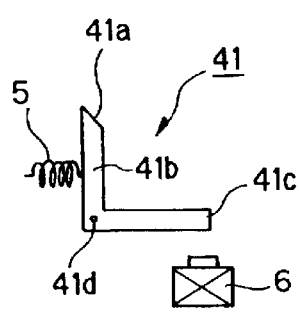
(B)
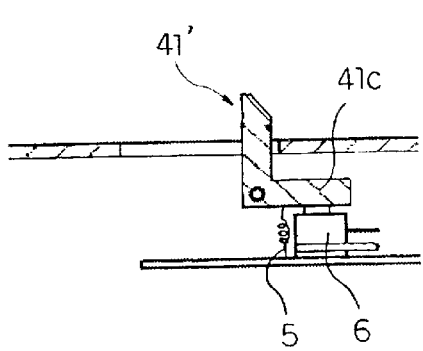
(C)
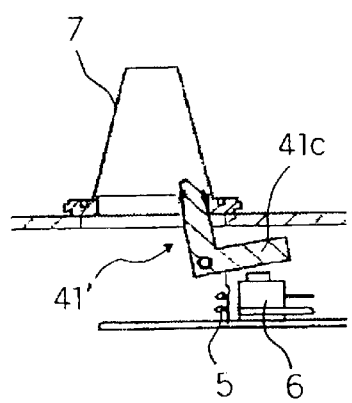
(D)

[Fig. 6]
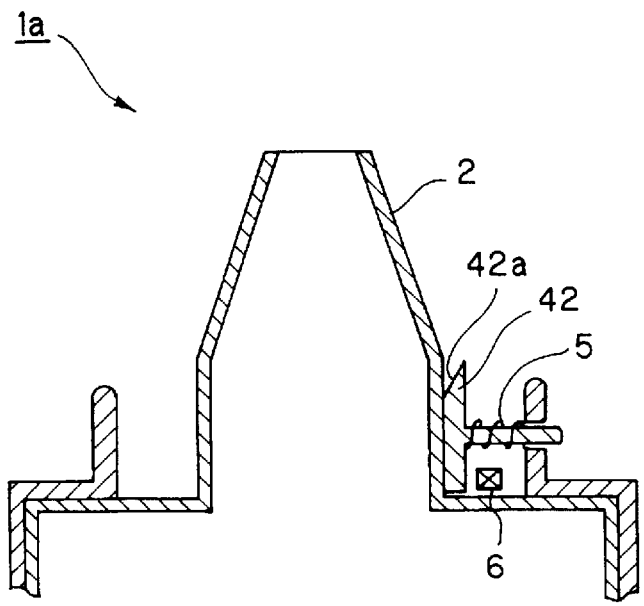
[Fig. 7]
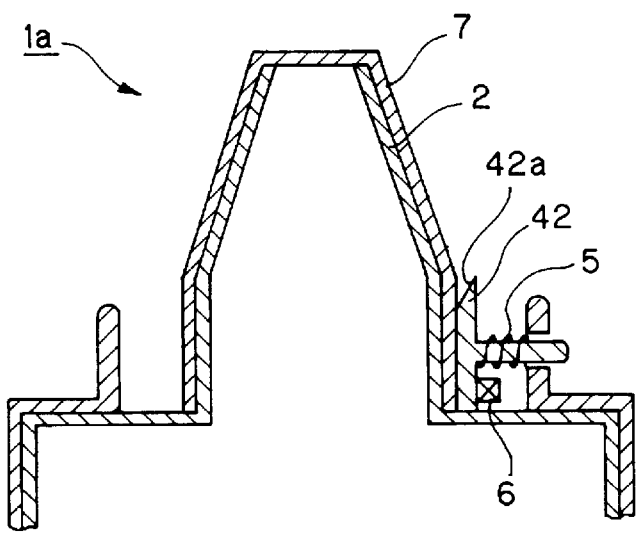

[Fig. 8]
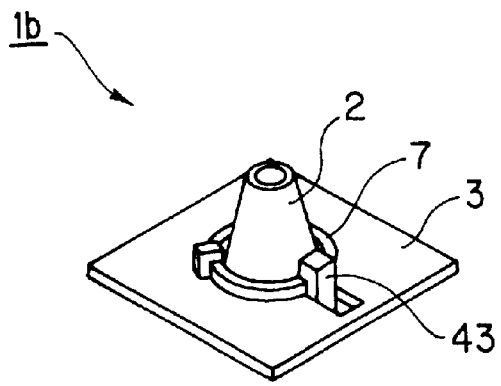
[Fig. 9]
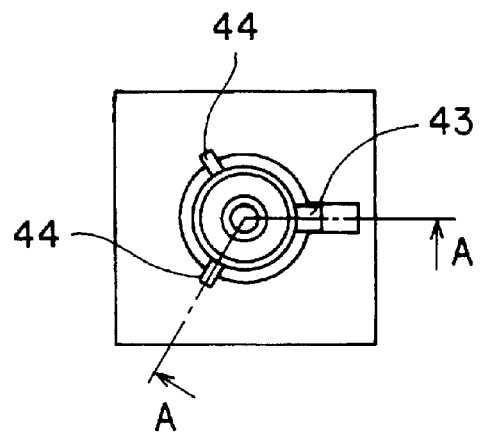
[Fig. 10]
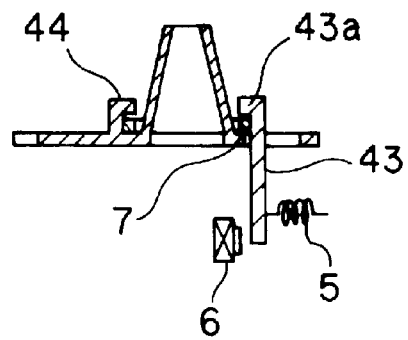

[Fig. 11]
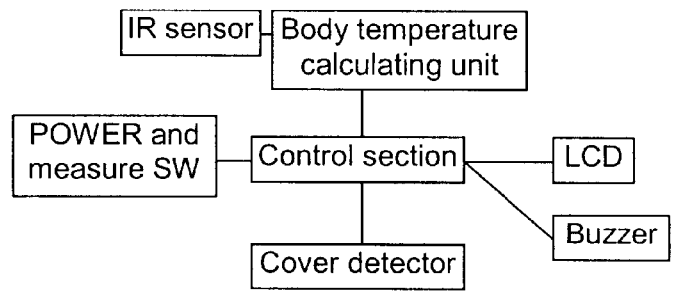
[Fig. 12]
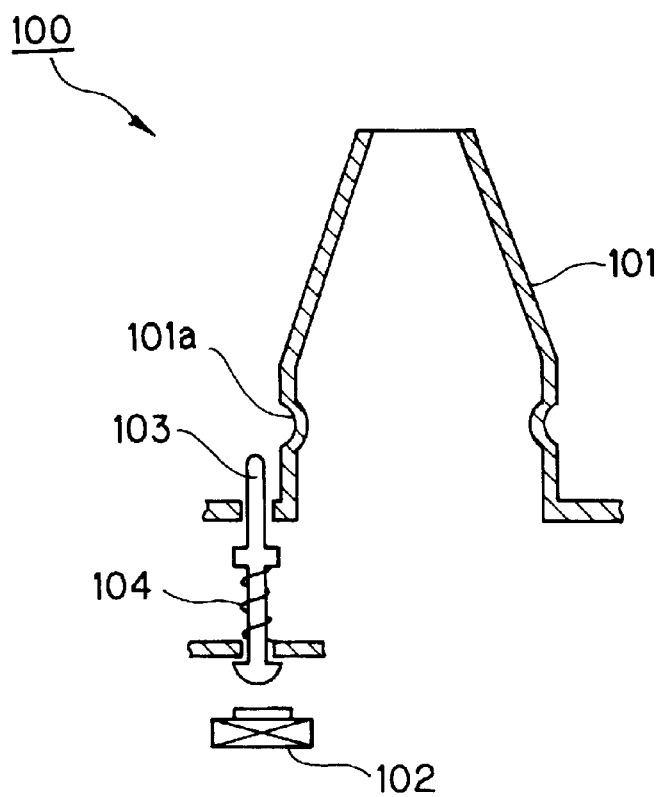

[Fig. 13]
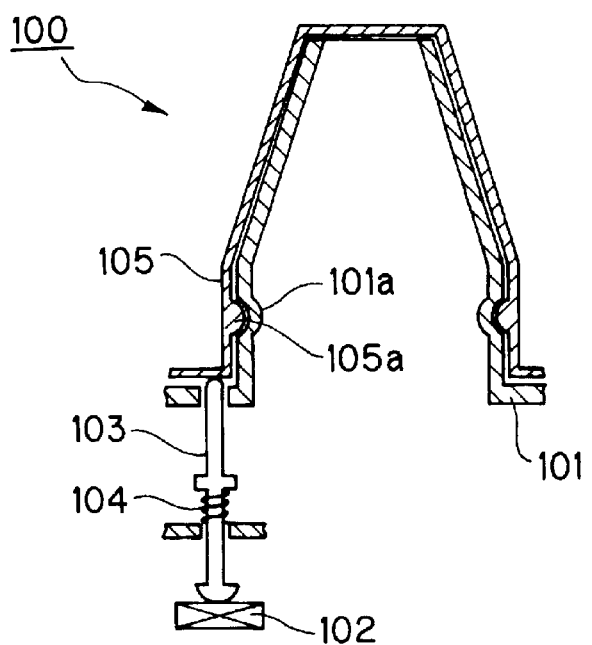

INFRARED RAY CLINICAL THERMOMETER

BACKGROUND OF THE INVENTION

1. Field of the Invention

The present invention relates to an infrared ray clinical thermometer for measuring body temperature by detecting an infrared ray radiated from the tympanic membrane.

2. Description of the Related Art

Hitherto, from the sanitary viewpoint, the infrared ray clinical thermometer of this type is usually furnished with a probe cover to protect the probe to be inserted into an external acoustic meatus. That is, since the tip of the probe is opened, and it is hard to clean or sterilize the inside, a cover is used to plug the opening.

Such a probe cover has a membrane for plugging the opening. The infrared ray from the tympanic membrane transmits through the membrane of the probe cover and is detected by the infrared ray detection sensor provided inside the probe.

On the other hand, when measured without using a probe cover, the infrared ray from the tympanic membrane is directly (without transmitting through the membrane) detected by the infrared ray detection sensor.

Therefore, depending on the presence or absence of the fitted probe cover, the intensity of the detected infrared ray varies. To solve this problem, a infrared ray clinical thermometer provided with a mechanism for detecting the presence or absence of a fitted probe cover is known.

An infrared ray clinical thermometer of the prior art having such mechanism for detecting the presence or absence of a fitted probe cover is explained by referring to FIGS. 12 and 13.

FIG. 12 and FIG. 13 are schematic sectional views showing the vicinity of the probe of the infrared ray clinical thermometer of the prior art, and specifically FIG. 12 shows a state prior to fitting the probe cover and FIG. 13 shows a state after fitting the probe cover.

As shown in the diagrams, on the outer circumference of a probe 101 of an infrared ray clinical thermometer 100, an annular recess 101a is provided for receiving a probe cover 105. On the inner circumference of the probe cover 105, an annular bump 105a is provided to be fitted with the recess 101a. Therefore, by the recess-bump engagement, the probe cover 105 is fitted and fixed.

A switch 102 is disposed inside the probe 101. A parting member 103 for making contact with or departing from the switch 102 is also provided. A spring 104 is provided for thrusting this parting member 103 in a direction for detaching the probe cover 105.

The parting member 103 is provided so that its part may project to the outside of the probe 101.

In this configuration, in a state prior to fitting the probe cover 105 as shown in FIG. 12, the parting member 103 is forced by the thrusting force of the spring 104, and the tip of the parting member 103 is apart from the switch 102.

On the other hand, when the probe cover 105 is fitted as shown in FIG. 13, the parting member 103 is pressed, resisting the thrusting force of the spring 104, by the flange provided in the probe cover 105, and its end makes contact with the switch 102.

Thus, as the parting member 103 makes contact with or departs from the switch 102, it is detected by the switch 102, and the presence or absence of the fitted probe cover 105 is detected.

However, such prior art as mentioned above, had the following problems.

In the mechanism for detecting the presence or absence of the fitted probe cover 105, when the probe cover 105 was fitted, the probe cover 105 is forced in a removal direction (detaching direction) by the parting member 103 through the spring 104.

Therefore, if the fitting force of the probe cover 105 (in the illustrated example, fitting force by the recess-bump engagement) is insufficient, the probe cover 105 may be detached.

If the fitting force is increased to solve this problem, a larger force is needed when fitting or detaching the probe cover, and handling is difficult.

Further, a special mechanism may be employed for attaching and detaching the probe cover, such as screw fixing mechanism or special locking mechanism. However, in this case, attaching or detaching may be difficult, the structure may be complicated, or the cost may be increased.

The present invention is devised to solve the problems of the above-mentioned prior art, and it is hence an object thereof to present an infrared ray clinical thermometer with enhanced stability when fitting a probe cover in a simple structure.

SUMMARY OF THE INVENTION

To achieve the above mentioned object, the infrared ray clinical thermometer of the present invention comprises a probe to be inserted into an external acoustic meatus, a probe cover fitted to cover the probe, a movable part moving nearly in a direction perpendicular to the detaching direction as the probe cover is detached or attached, and detecting means for detecting the presence or absence of the fitted probe cover by the movement of the movable part.

Herein, the movement of the movable part includes, for example, sliding along a guide, oscillating on an axis, and elastic flexural deformation.

According to the configuration of the present invention, since the movable part is designed to move in a direction nearly perpendicular to the detaching direction of the probe cover, the movable part will not direct a force in the probe cover detaching direction.

Preferably, the movable part has a slope to be pressed to the inner wall of the probe cover by the fitting action of the probe cover to generate a component of force at the inner side of the probe. Thrusting means is provided for thrusting the movable part to the outer side of the probe, when fitting the probe cover, thereby resisting the thrusting force of the thrusting means. The movable part is moved to the inner side of the probe by the component of force generated from the slope. When detaching the probe cover, by the thrusting force of the thrusting means, the movable part is moved to the outer side of the probe.

Alternatively, the movable part has a slope to be pressed to the outer wall of the probe cover by the fitting action of the probe cover to generate a component of force at the outer side of the probe. Thrusting means is provided for thrusting the movable part to the inner side of the probe, when fitting the probe cover, thereby resisting the thrusting force of the thrusting means. The moveable part is moved to the outer side of the probe by the component of force generated from the slope. When detaching the probe cover, by the thrusting force of the thrusting means, the movable part is moved to the inner side of the probe.

Preferably, the detecting means has a switch which makes contact when the movable part moves to the outer side of the probe, and departs when moving to the inner side, or makes contact when the movable part moves to the inner side of the probe, and departs when moving to the outer side.

In another embodiment of the invention, the infrared ray clinical thermometer comprises a probe to be inserted into an external acoustic meatus, a probe cover fitted to cover the entire probe, a holding member provided movably in a direction nearly perpendicular to the detaching direction for holding the probe cover, and detecting means for detecting the presence or absence of the fitted probe cover by the movement of the holding member.

Herein, the movement of the holding member includes, for example, sliding along a guide, oscillating on an axis, and elastic flexural deformation.

According to this embodiment, since the holding member is designed to move in a direction nearly perpendicular to the detaching direction of the probe cover, the movable part will not provide a force in the probe cover detaching direction.

Preferably, the holding member has an engaging portion to be engaged with the probe cover. Thrusting means is further provided to thrust the holding member in a direction so that the engaging portion may be engaged with the probe cover.

BRIEF DESCRIPTION OF THE DRAWINGS

FIG. 1 is a perspective outline view of an infrared ray clinical thermometer according to a first preferred embodiment of the present invention.

FIG. 2 is a longitudinal sectional view near the probe of the infrared ray clinical thermometer in the first preferred embodiment of the present invention.

FIG. 3 is a longitudinal sectional view near the probe of the infrared ray clinical thermometer in the first preferred embodiment of the present invention.

FIG. 4 is a partially developed diagram of parts of the infrared ray clinical thermometer in the first preferred embodiment of the present invention.

FIG. 5 is a schematic diagram of principle parts of the infrared ray clinical thermometer in a second preferred embodiment of the present invention.

FIG. 6 is a longitudinal sectional view near the probe of infrared ray clinical thermometer in a third preferred embodiment of the present invention.

FIG. 7 is a longitudinal sectional view near the probe of the infrared ray clinical thermometer in the third preferred embodiment of the present invention.

FIG. 8 is a perspective view near principle parts of the infrared ray clinical thermometer in a fourth preferred embodiment of the present invention.

FIG. 9 is a plan view near principle parts of the infrared ray clinical thermometer in the fourth preferred embodiment of the present invention.

FIG. 10 is a longitudinal sectional view near principle parts of the infrared ray clinical thermometer in the fourth preferred embodiment of the present invention.

FIG. 11 is a block diagram showing a control configuration of the infrared ray clinical thermometer in a preferred embodiment of the present invention.

FIG. 12 is a schematic sectional view showing near the probe of infrared ray clinical thermometer in a prior art.

FIG. 13 is a schematic sectional view showing near the probe of the infrared ray clinical thermometer in the prior art.

DETAILED DESCRIPTION OF THE PREFERRED EMBODIMENTS

Referring now to the drawings, preferred embodiments of the invention are specifically described below. Dimensions, materials, shapes, and relatively configuration of the constituent components described in the embodiments are not intended to limit the scope of the invention unless otherwise specified.

Referring to FIG. 1 through FIG. 4, an infrared ray clinical thermometer according to a first preferred embodiment is described below.

First, referring to FIG. 1, a general configuration of the infrared ray clinical thermometer is explained. FIG. 1 is a perspective outline view of the infrared ray clinical thermometer in the first preferred embodiment of the present invention, in which A shows a state without a probe cover, and B shows a state in which a probe cover is fitted.

An infrared ray clinical thermometer 1 comprises a probe 2 to be inserted into the external acoustic meatus, and an infrared ray clinical thermometer main body 3.

The infrared ray clinical thermometer main body is known in the art, and description of its basic structure is omitted. However, a battery or other power source and circuit board are provided inside the infrared ray clinical thermometer main body 3, and a display unit for showing the measurement result is provided in the rear side of the infrared ray clinical thermometer main body 3.

When measuring, while holding the infrared ray clinical thermometer main body 3 by one hand, the probe 2 is inserted into the external acoustic meatus, and a measure switch 32 provided in the infrared ray clinical thermometer main body 3 is pressed so that the body temperature (tympanic membrane temperature) can be measured in a short amount of time.

The probe 2 is nearly cylindrical so as to be easily inserted into the external acoustic meatus, and an infrared ray detection sensor is provided in its inside. When the probe sensor 2 is inserted into the external acoustic meatus, the infrared ray radiated from the tympanic membrane invades into the tube, and is detected by the infrared ray detection sensor. Based on the detection data, the body temperature is measured.

The mechanism for detecting the presence or absence of the fitted probe cover is explained by referring to FIG. 2 through FIG. 4. FIG. 2 and FIG. 3 are longitudinal sectional views near the probe of the infrared ray clinical thermometer in the first preferred embodiment of the invention. Specifically, FIG. 2 shows a state without a fitted probe cover and FIG. 3 shows a state in which the probe cover is fitted. FIG. 4 is a partially developed diagram of parts of the infrared ray clinical thermometer according to the first preferred embodiment of the invention.

As shown in FIG. 3, a probe cover 7 has a flange 71 at its end. The probe cover 7 covers the entire probe 2, and in the fitted state of the probe cover 7, the opening at the tip of the probe 2 is plugged.

When fitting the probe cover 7, in FIG. 2 and FIG. 3, the probe cover 7 is fitted from top to bottom in the drawing. When detaching the probe cover 7, on the other hand, it is removed from bottom to top in the drawing in FIG. 2 and FIG. 3.

The mechanism for detecting the presence or absence of the fitted probe cover 7 is provided near the root of the probe 2, and it is mainly composed of a slide member 4 as a movable part, a spring 5 as thrusting means for thrusting the slide member 4, and a switch 6 for making contact with or departing from the slide member 4. The switch 6 is a principle member for detecting the presence or absence of the fitted probe cover.

The slide member 4 is designed to slide along a guide groove 21 provided integrally with the probe 2, and a part of its upper part projects outside from an opening 31 provided in the housing for forming the appearance of the thermometer main body 3. The guide groove 21 may be formed separately from the probe 2.

Therefore, the slide member 4 is provided movably in a nearly perpendicular direction to the detaching direction of the probe cover 7, that is, from the inner side to the outer side, and from the outer side to the inner side of the probe 2 (in the lateral direction in FIG. 2 and FIG. 3).

In the upper part of the slide member 4 (the portion projecting outside from the opening 31), there is a slope 4a which inclined from the inner side to the outer side of the probe 2, as going from the tip side of the probe 2 toward the root direction, and a protuberance 4b is also provided on the outer circumference.

A smoothly sliding material is preferred for the slide member 4, and, for example, POM (polyoxy methylene) is preferable.

The spring 5 is designed to thrust the slide member 4 from the inner side to the outer side of the probe 2 (in FIG. 2 and FIG. 3, from left to right). The spring force (thrusting force) of the spring 5 is set to slide the slide member 4 securely to the outer side when the probe cover 7 is not fitted.

The switch 6 is turned on or off as the protuberance 4b of the slide member 4 makes contact with or departs from, and it is realized, for example, by a general switch mechanism having a button to be pressed down when making contact with the protuberance 4b of the slide member 4.

In this configuration, as shown in FIG. 2, without fitting the probe cover 7, the slide member 4 slides toward the outer side of the probe 2 by the force of the spring 5, and the slide member 4 is in contact with the switch 6. In this embodiment, the switch 6 is turned on in this state.

When fitting the probe cover 7, in its fitting process, the inner wall of the probe cover 7 presses the slope 4a formed in the slide member 4. By this slope 4a, a component of force is generated toward the inner side of the probe 2, and the slide member 4 slides to the inner side of the probe 2 by resisting the spring force of the spring 5.

As a result, as shown in FIG. 3, the slide member 4 departs from the switch 6. In this embodiment, the switch 6 is turned off.

Thus, while the switch 6 is turned on, it is detected that the probe cover 7 is not fitted, and when the switch 6 is turned off, on the other hand, it is detected that the probe cover 7 is fitted.

In this embodiment, the thrusting direction by the spring 5 is nearly perpendicular to the detaching direction of the probe cover 7, so that no effect results in the detaching direction of the probe cover 7.

Therefore, in spite of the mechanism for detecting the presence or absence of the fitted probe cover, unlike the prior art, the probe cover is not easily detached, and a stable fitting state can be maintained.

Besides, it is not necessary to set a large force for engagement, and detaching or attaching can be easily done, and handling is easy as well. Further, the invention does not require any particular mechanism for detaching or attaching (such as a screw mechanism or a lock mechanism), the structure is simplified, and attaching or detaching is easy.

Since detaching or attaching of the probe cover is easy, it only takes a short amount of time to detach or attach the probe cover, and a measuring error can be suppressed at the same time. That is, when fitting, the heat of the hand may warm the probe, and this becomes a factor which causes a measuring error. Therefore, the time needed to fit the probe cover should be as short as possible.

The shape of the probe cover is not particularly limited as far as the entire probe can be covered, and for example, the sectional shape may be circular, elliptical, or polygonal. Considering the convenience of fitting, the shape is desired to be designed to press the slope 4a of the slide member 4, regardless of the direction (direction in the turning direction) when fitting on the probe 2.

In the illustrated example, the slide member makes contact with the switch when the probe cover is not fitted, and when slide member departs from the switch when fitted. However, a reverse configuration is also possible. That is, the slide member departs from the switch when the probe cover is not fitted, and when slide member makes contact with the switch when fitted. That is, the switch may be turned on or off by movement of the slide member, and in short, it is sufficient when the movement of the slide member can be detected.

However, as in the embodiment, in the case where the switch 6 is turned off when the probe cover 7 is fitted, if the switch 6 is defective and the switch 6 is always in the off state, although the presence or absence of the fitted probe cover 7 cannot be detected, it is advantageous because the body temperature can be measured as usual (assuming the probe cover 7 is fitted). That is, as mentioned later, if it is desired to prevent the body temperature from being measured while the probe cover 7 is not fitted, in this embodiment, the body temperature cannot be measured when the switch 6 is turned on. To the contrary, in another configuration in which the switch is turned on when the probe cover is fitted, the body temperature cannot be measured when the switch is turned off. In this case, it is disadvantageous because the body temperature cannot be measured when the switch is defective and is always in the off state.

In another method of detecting movement of the movable part (slide member), known techniques can be applied, such as optical systems (for detecting movement by detecting passing, shielding or reflection of light depending on the position of a movable part, by a light emitter and a light detector), or a magnetic system (for detecting movement by fluctuation of a magnetic field by a magnetic sensor by installing a magnetic element in the movable part).

A mode of using a device having a mechanism for detecting the presence or absence of a fitted probe cover is briefly explained below.

As mentioned above, since the intensity of the detected infrared ray differs depending on the presence or absence of a fitted probe cover, if the body temperature (tympanic membrane temperature) is measured uniformly from detecting the infrared ray regardless of the presence or absence of a fitted probe cover, a measuring error occurs depending on the presence or absence of a fitted probe cover.

Accordingly, in order to prevent body temperature measurement while the probe cover is not fitted, it is possible to make use of the mechanism for detecting the presence or absence of a fitted probe cover.

That is, with the fitted probe cover 7, as mentioned above, the switch 6 is turned off, and without the probe cover 7, the switch 6 is turned on. By using a circuit configuration which allows body temperature measurement only while the switch 6 is turned off, body temperature measurement with an unfitted probe cover 7 can be prevented. Therefore, measurement errors due to the presence or absence of a fitted probe cover can be prevented.

In another mode of using a device having a mechanism for detecting the presence or absence of a fitted probe cover, for example, a circuit for correcting an error which may occur depending on the presence or absence of a fitted probe cover is provided, and the body temperature can be calculated from the detection data of the infrared ray depending on the presence or absence of a fitted probe cover.

An example of control configuration of an infrared ray clinical thermometer in this preferred embodiment is explained by referring to FIG. 11. FIG. 11 is a block diagram showing a control configuration of the infrared ray clinical thermometer in this preferred embodiment.

As shown in the diagram, the control section is responsible for controlling parts, and is designed to receive information from the parts, and also send information to the parts.

That is, when the control section detects a POWER input and a measure SW (measure switch 32), it determines whether to measure or to correct based on the detection result (information about the presence or absence of a fitted probe cover) from the cover detector. When measuring, the body temperature calculated in the body temperature calculation unit from the data detected by an IR sensor (infrared ray detection sensor) is displayed in an LCD (display unit).

If a warning is to be issued, the buzzer sounds to warn the user. As warning information, for example, when the probe cover is not fitted, the buzzer may sound to warn the user of this fact. At the same time, more preferably, the warning should be also indicated on the LCD. Otherwise, the buzzer may sound to signify that the measurement is complete.

FIG. 5 shows a second preferred embodiment. In the first preferred embodiment, mentioned above, the movable part composing the mechanism for detecting the presence or absence of a fitted probe cover is composed in the slide member which is slidably disposed. In this preferred embodiment, the movable part is composed in an oscillating member which is oscillatably supported.

The other configurations and functions are the same as in the first preferred embodiment, and explanation of the same parts is omitted.

FIG. 5 is a schematic diagram of the principle parts (mechanical parts for detecting the presence or absence of a fitted probe cover) for composing the infrared ray clinical thermometer in the second preferred embodiment of the present invention. Specifically, diagram A shows a state in which the probe cover is not fitted, and B shows a state in which the probe cover is fitted.

In this preferred embodiment, the mechanism for detecting the presence or absence of a fitted probe cover is provided near the root of the probe as in the first preferred embodiment, and is mainly composed of an oscillating member 41 oscillatably provided, a spring 5 as thrusting means for thrusting this oscillating member 41, and a switch 6 to make contact with and depart from the oscillating member 41.

The spring 5 and switch 6 are the same as in the first preferred embodiment except that the locations are different, and their explanation is omitted.

The oscillating member 41 is a nearly L-shaped member, and is oscillatably supported at a position corresponding to its intersection by a shaft 41d. The shaft 41d may be provided either integrally with the probe, or at the device main body side.

The oscillating member 41 comprises a movable part 41b movable nearly in a direction perpendicular to the detaching direction of the probe cover as in the first preferred embodiment and an arm 41c making contact with or departing from the switch 6.

At the tip of the movable part 41b, as in the first preferred embodiment, a slope 41a is provided. The tubular body of the movable part 41b is formed from the inner side to the outer side of the probe (from left to right in the drawing in FIG. 5) by the spring 5.

In this configuration, in a state in which the probe cover is not fitted, as shown in FIG. 5A, the movable part 41b is forced by the spring 5 and is moved to the outer side of the probe. Therefore, on the whole, the oscillating member 41 rotates in the clockwise direction in the diagram.

As a result, the arm 41c moves downward in the diagram, and makes contact with the switch 6 (pressing down on the button), so that the switch 6 is turned on.

When the probe cover is fitted, in its fitting process, the inner wall of the probe cover presses the slope 41a provided in the movable part 41b. Therefore, by this slope 41a, a component of force directed to the inner side of the probe 2 is generated, and the movable part 41b moves to the inner side of the probe 2 by resisting the spring force by the spring 5.

That is, the oscillating member 41, on the whole, rotates in the counterclockwise direction in FIG. 5. As shown in FIG. 5(B), the oscillating member 41 departs from the switch 6. In this embodiment, the switch 6 is turned off in this state.

Thus, it is detected that the probe cover is not fitted when the switch 6 is turned on. On the other hand, it is detected that the probe cover is fitted when the switch 6 is turned off.

In this embodiment, the thrusting direction by the spring 5 is nearly perpendicular to the detaching direction of the probe cover, and there is no resulting effect in the detaching direction of the probe cover 7, and the same effects as in the first preferred embodiment, mentioned above, are obtained.

FIGS. 5(C) and 5(D) show modified examples of FIGS. 5(A) and 5(B). That is, FIG. 5(C) shows the probe cover is not fitted, and FIG. 5(D) shows the probe cover is fitted.

In the case of FIGS. 5(A) and 5(B), the movable part 41b is forced by the spring 5, whereas in the case of the oscillating member 41' in FIGS. 5(C) and 5(D), it is forced to the arm 41c by the spring 5.

In this configuration, too, the thrusting direction of the spring 5 itself is same as the detaching direction of the probe cover 7. However, since the oscillating member 41' has an L-shape, a force acts on the probe cover 7 in a direction nearly perpendicular to the detaching direction so that the same effects as in the case of FIGS. 5(A) and 5(B) can be obtained.

FIG. 6 and FIG. 7 show a third preferred embodiment. In the first preferred embodiment, mentioned above, the movable part (slide member) is forced toward the outer side of the probe by the thrusting means, and the movable part is moved toward the inner side of the probe by fitting the probe cover, but in this preferred embodiment, to the contrary, the movable part (slide member) is forced toward the inner side of the probe by the thrusting means, and the movable part is moved toward the outer side of the probe by fitting the probe cover.

The other basic configuration and action are the same as in the first preferred embodiment, and explanation of the same parts is omitted.

FIG. 6 and FIG. 7 are longitudinal sectional views near the probe of the infrared ray clinical thermometer in the third preferred embodiment of the invention. FIG. 6 shows a state in which the probe cover is not fitted. FIG. 7 shows a state in which the probe cover is fitted.

The mechanism for detecting the presence or absence of the fitted probe cover 7 in the infrared ray clinical thermometer 1a in this embodiment is provided near the root of the probe 2, and is mainly composed of a slide member 42 as a movable part, a spring 5 as thrusting means for thrusting the slide member 42, and a switch 6 making contact with or departing from the slide member 42. The switch 6 is a principle component of detecting means for detecting the presence or absence of a fitted probe cover.

The slide member 42 in this embodiment is similar to that of the first preferred embodiment, mentioned above, that is, it is movably disposed in a direction nearly perpendicular to the detaching direction of the probe cover 7, that is, from the inner side to the outer side, and from the outer side to the inner side of the probe 2 (in FIG. 6 and FIG. 7, in the lateral direction in the drawing).

In the upper part of the slide member 42, from the tip side toward the root direction of the probe 2, a slide 42a is formed to incline from the outer side to the inner side of the probe 2.

The spring 5 thrusts the slide member 42 from the outer side to the inner side of the probe 2 (in FIG. 6 and FIG. 7, from right to left in the drawing). The switch 6 is turned on or off by making contact with or departing from the slide member 42.

In this configuration, as shown in FIG. 6, when the probe cover 7 is not fitted, the slide member 42 slides toward the inner side of the probe 2 by the spring 5, and the slide member 42 is apart from the switch 6.

When the probe cover 7 is fitted, in its fitting process, the inner wall of the probe cover 7 presses the slope 42a of the slide member 42. Therefore, a component of force directed toward the outer side of the probe 2 is generated by the slope 42a, and the slide member 42 slides to the outer side of the probe 2 by resisting the spring force by the spring 5, and makes contact with the switch 6.

Thus, as in the first preferred embodiment, mentioned above, the slide member 42 makes contact with or departs from the switch 6 depending on the presence or absence of the fitted probe cover 7, and the switch 6 is turned on or off so that the presence or absence of the fitted probe cover 7 can be detected.

In this embodiment, the thrusting direction of the spring 5 is nearly perpendicular to the detaching direction of the probe cover 7, and there is no resulting effect in the detaching direction of the probe cover 7 so that the same effects as in the above-mentioned embodiments can be obtained.

In this embodiment, the slide member departs from the switch when the probe cover is not fitted, and the slide member makes contact with the switch when the probe cover is fitted, but to the contrary, same as in the first and second preferred embodiments, mentioned above, the same effects are obtained in the configuration in which the slide member makes contact with the switch when the probe cover is not fitted, and the slide member departs from the switch when the probe cover is fitted.

FIG. 8 to FIG. 10 show a fourth preferred embodiment. In the foregoing preferred embodiments, the movable part is not furnished with a function for intentionally holding the probe cover. In this preferred embodiment, a member corresponding to the movable part in the above embodiments is composed of a holding member for holding the probe cover.

The other basic configurations and functions are the same as in the first preferred embodiment, and explanation of the same parts is omitted.

FIG. 8 is a perspective view near principle parts (near probe) of the infrared ray clinical thermometer in the fourth preferred embodiment of the invention. FIG. 9 is a plan near principle parts (near probe) of the infrared ray clinical thermometer in the fourth preferred embodiment of the invention. FIG. 10 is a longitudinal sectional view near principle parts (near the probe) of the infrared ray clinical thermometer in the fourth preferred embodiment of the invention.

In each drawing, to simplify the explanation, only the flange portion of the probe cover 7 provided at the end is shown.

The infrared ray clinical thermometer 1b in the embodiment comprises an engaging piece 44 fixed to a housing for forming the appearance of the thermometer main body 3, and a holding member 43 having an engaging protuberance 43a. The engaging piece 44 and holding member 43 are engaged with the flange of the probe cover 7 so that the probe cover 7 is held in place.

The mechanism for detecting the presence or absence of the fitted probe cover 7 is provided near the root of the probe 2, and is mainly composed of the above-mentioned holding member 43 movably formed in a direction nearly perpendicular to the detaching direction of the probe cover 7, a spring 5 as thrusting means for thrusting the holding member 43 to the inner side of the probe 2, and a switch 6 making contact with or departing from the holding member 43.

In this configuration, although not particularly illustrated, without the fitted probe cover 7, the holding member 43 slides toward the inner side of the probe 2 by means of the spring 5, and the holding member 43 is in contact with the switch 6.

On the other hand, as shown in FIG. 10, when the probe cover 7 is fitted, the holding member 43 slides toward the outer side of the probe 2 by resisting the thrusting force of the spring 5, and the holding member 43 departs from the switch 6.

Thus, as in the first preferred embodiment mentioned above, depending on the presence or absence of the fitted probe cover 7, the holding member 43 makes contact with or departs from the switch 6, and the switch 6 is turned on or off so that presence or absence of the fitted probe cover 7 can be detected.

In this embodiment, the thrusting direction of the spring 5 is nearly perpendicular to the detaching direction of the probe cover 7, and there is no resulting effect in the detaching direction of the probe cover 7 so that the same effects as in the foregoing embodiments can be obtained.

In this embodiment, when fitting the probe cover 7, while maintaining the sliding state of the holding member 43 to the outer side by resisting the spring 5 by hand or finger, the probe cover 7 can be fitted.

Otherwise, while inclining the probe cover 7, by sliding the holding member 43 by hooking its flange on the engaging protuberance 43a of the holding member 43, the probe cover 7 can be erected in this state and is engaged with the engaging piece 44 so that the probe cover 7 can be fitted.

When detaching the probe cover 7, while lifting the probe cover 7, by sliding the holding member 43 to the outer side by resisting the thrusting force of the spring 5, the probe cover 7 can be inclined, and the engaging piece 44 is disengaged. Then, the probe cover 7 can be disengaged from the engaging protuberance 43a of the holding member 43.

As described herein, the present invention can enhance the stability of fitted probe covers in a simple configuration.

What is claimed is:

1. An infrared ray clinical thermometer comprising:
   a probe to be inserted in the external acoustic meatus;
   a probe cover fitted to cover the entire probe;
   a movable part moving nearly in a direction perpendicular to a detaching direction of the probe cover, wherein the probe cover moves the movable part when detached or attached to the probe; and
   a detector for detecting the presence or absence of the probe cover by the movement of the movable part.

2. The infrared ray thermometer according to claim 1, further comprising:
- a slope in the moveable part pressed to an inner wall of the probe cover by a fitting action of the probe cover to generate a component of force at an inner side of the probe; and
- a thruster for thrusting the movable part to an outer side of the probe, wherein
- when fitting the probe cover, resisting the thrusting force of the thruster, the movable part moves to the inner side of the probe by the component of force generated from the slope in the moveable part, and
- when detaching the probe cover, by the thrusting force of the thruster, the movable part is moved to the outer side of the probe.

3. The infrared ray thermometer according to claim 2, further comprising:
- a switch which makes contact when the movable part moves to the outer side of the probe, and departs when moving to the inner side of the probe, or makes contact when the movable part moves to the inner side of the probe, and departs when moving to the outer side of the probe.

4. The infrared ray thermometer according to claim 3, further comprising:
- an engaging portion on the holding member to be engaged with the probe cover, and
- a thruster to thrust the holding member in a direction so that the engaging portion engages the probe cover.

5. The infrared ray thermometer according to claim 1, further comprising:
- a slope in the moveable part pressed to an outer wall of the probe cover by a fitting action of the probe cover to generate a component of force at an outer side of the probe; and
- a thruster for thrusting the movable part to an inner side of the probe, wherein
- when fitting the probe cover, resisting the thrusting force of the thruster, the movable part is moved to the outer side of the probe by the component of force generated from the slope in the moveable part, and
- when detaching the probe cover, by the thrusting force of the thruster, the movable part is moved to the inner side of the probe.

6. The infrared ray thermometer according to claim 5, further comprising:
- a switch which makes contact when the movable part moves to the outer side of the probe, and departs when moving to the inner side of the probe, or makes contact when the movable part moves to the inner side of the probe, and departs when moving to the outer side of the probe.

7. The infrared ray thermometer according to claim 1, further comprising:
- a switch which makes contact when the movable part moves to an outer side of the probe, and departs when moving to an inner side of the probe, or makes contact when the movable part moves to the inner side of the probe, and departs when moving to the outer side of the probe.

8. An infrared ray thermometer, comprising:
- a probe to be inserted in an external acoustic meatus;
- a probe cover fitted to cover the probe;
- a holding member movably provided in a direction nearly perpendicular to a detaching direction of the probe cover, wherein the probe cover moves the holding member when detached or attached to the probe; and
- a detector for detecting the presence or absence of the fitted probe cover by the movement of the holding member.

* * * * *